June 17, 1947.　　　F. L. HAUSHALTER　　　2,422,483
ENDLESS TRACK CONSTRUCTION
Filed Aug. 29, 1944　　　5 Sheets-Sheet 1

INVENTOR.
FRED L. HAUSHALTER
BY
Bates, Teare, & McBean
ATTORNEYS

June 17, 1947.   F. L. HAUSHALTER   2,422,483
ENDLESS TRACK CONSTRUCTION
Filed Aug. 29, 1944   5 Sheets-Sheet 2

INVENTOR.
FRED L. HAUSHALTER
BY
Bates, Teare, y McBean
ATTORNEYS

June 17, 1947.   F. L. HAUSHALTER   2,422,483
ENDLESS TRACK CONSTRUCTION
Filed Aug. 29, 1944   5 Sheets-Sheet 3
Fig.-6
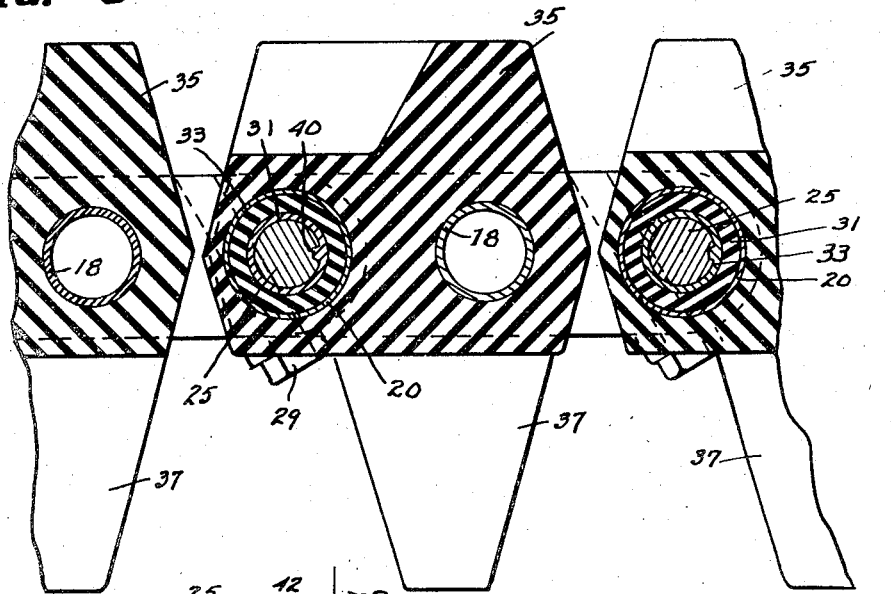
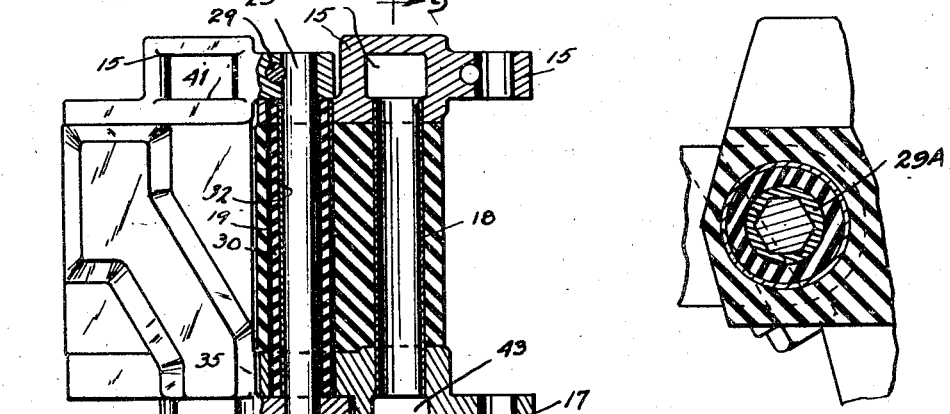
Fig.-7
Fig.-8
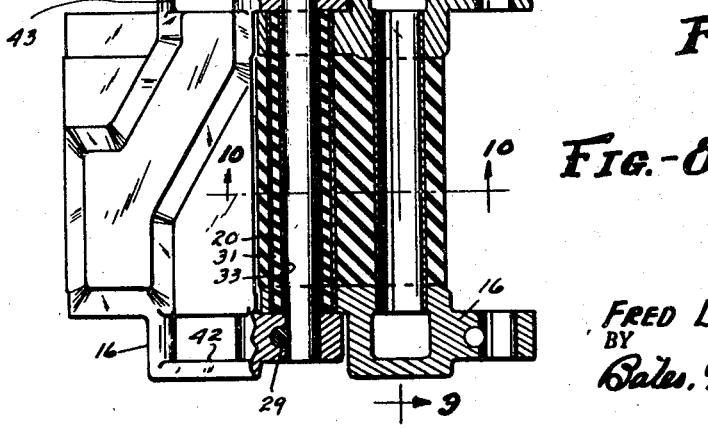
INVENTOR.
FRED L. HAUSHALTER
BY
Bates, Teare, & McKean
ATTORNEYS

INVENTOR.
FRED L. HAUSHALTER
BY
ATTORNEYS

INVENTOR.
FRED L. HAUSHALTER
BY
ATTORNEYS

Patented June 17, 1947

2,422,483

UNITED STATES PATENT OFFICE 2,422,483

ENDLESS TRACK CONSTRUCTION

Fred L. Haushalter, Akron, Ohio

Application August 29, 1944, Serial No. 551,684

6 Claims. (Cl. 305—10)

1

This invention relates to endless tracks, particularly those used on combat vehicles, and is particularly concerned with the manner of constructing the track sections so as to increase the life thereof.

Track sections heretofore used for endless tracks have become known in the trade as single pin sections and double pin sections, the single pin sections being connected directly together, whereas in the double pin type, the sections are connected together by end links, wherein the links bridge the gap between adjacent sections. It is desirable to produce a fabricated section which utilizes a block of rubber, as a ground engaging surface and as a supporting wheel engaging surface, but where the body of the section is made of cast metal, considerable difficulty has been experienced in obtaining a satisfactory bond between the rubber and the metal. This difficulty has been enhanced in the single type of section, but the single pin type is preferable over the double pin construction in view of the advantage gained by reduction in weight.

An object of the present invention, therefore, is to make a fabricated track for track laying vehicles, wherein a rubber surface may be readily and satisfactorily utilized, either for a ground engaging surface or a supporting wheel engaging surface, or both, and wherein a lightweight frame construction for the sections may be employed in connection with the rubber, while at the same time objections previously encountered in the effort to make rubber adhere to cast sections may be avoided. The invention, therefore, accomplishes a two-fold purpose in that it achieves a construction that facilitates the use of rubber tread blocks, either with or without the auxiliary use of steel grouser plates for the ground engaging surface, as desired.

Figure 1:
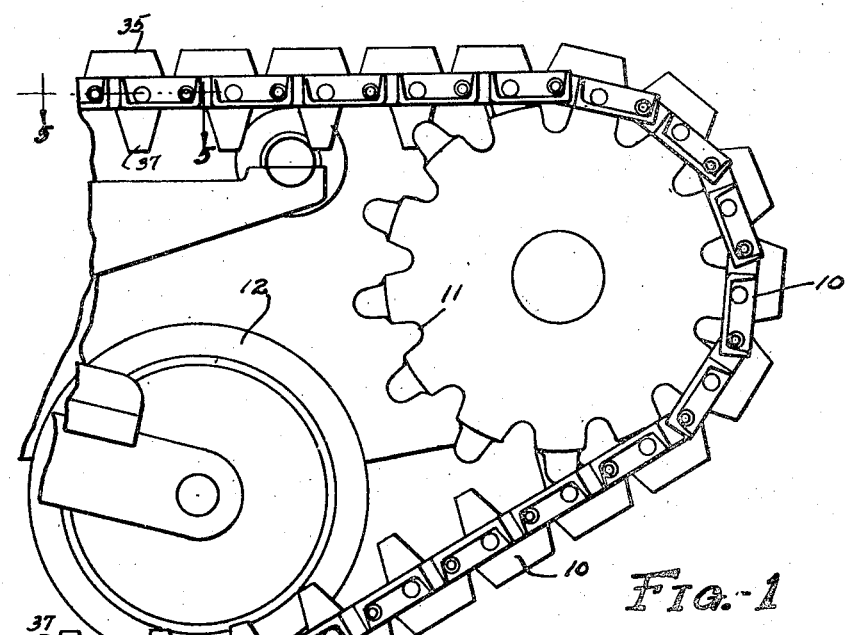
Figure 2:
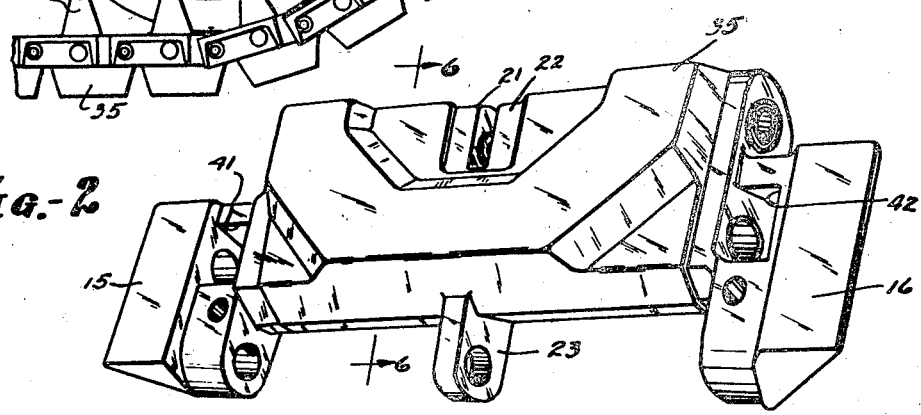
Figure 3:
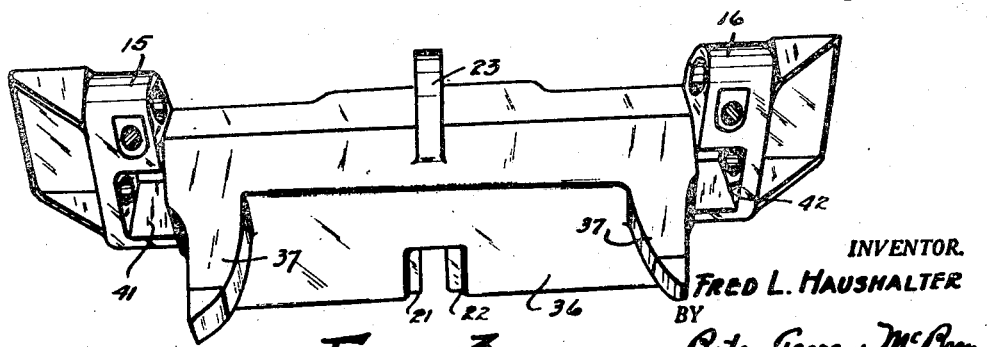
Figure 4:
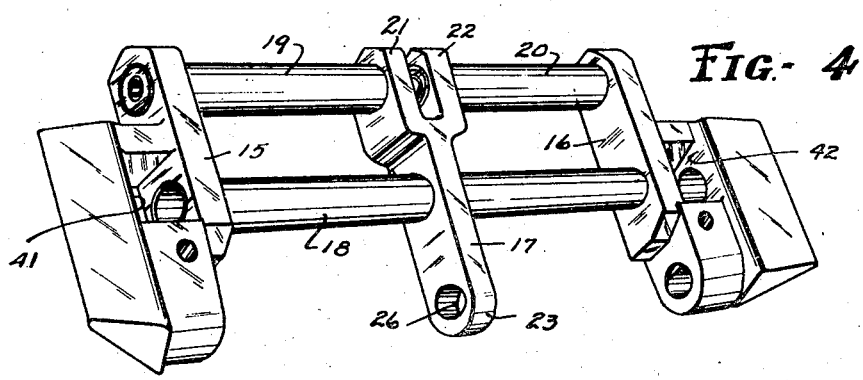
Figure 5:
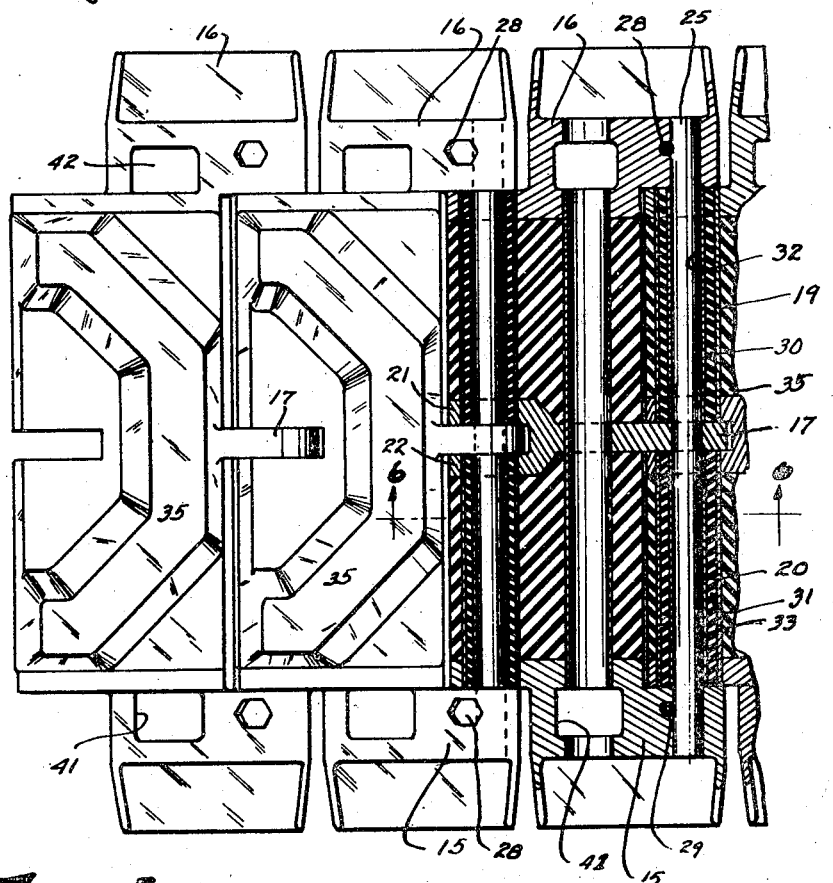
Figure 9:
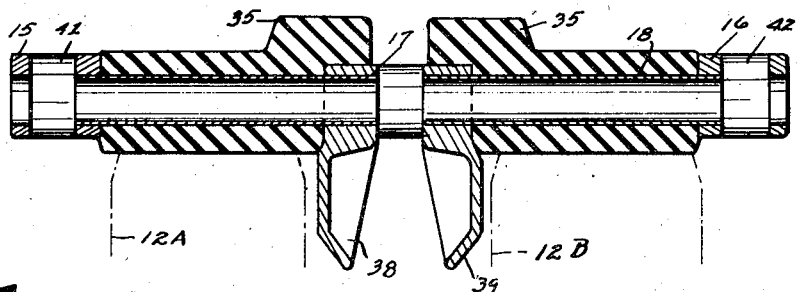
Figure 10:
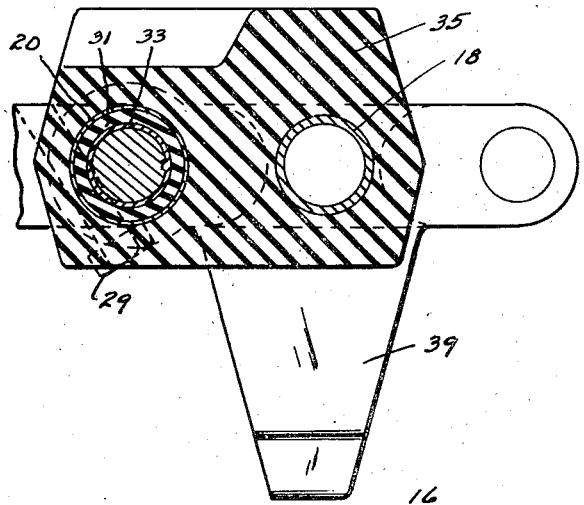
Figure 11:
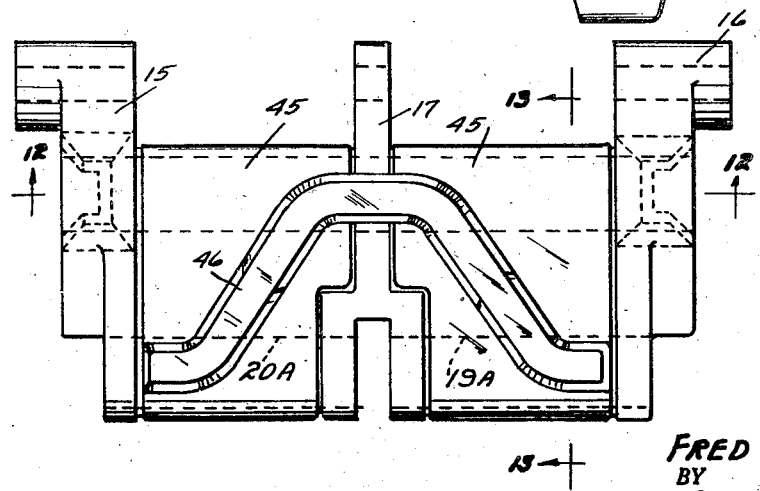
Figure 12:
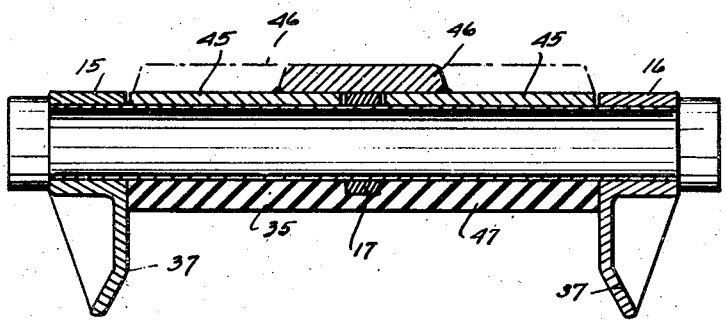
Figure 13:
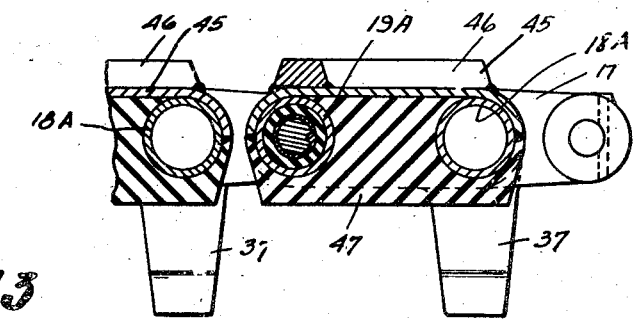
Figure 14:
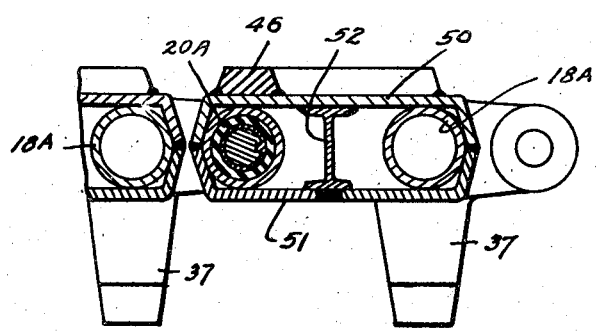

Referring now to the drawings, Fig. 1 is an end view of a part of an endless track tread embodying the present invention as applied to a vehicle structure; Fig. 2 is a perspective view of, one of the tread sections used in Fig. 1 looking toward the ground engaging surface of the section; Fig. 3 is a perspective view showing the opposite side of the section illustrated in Fig. 2; Fig. 4 is a perspective view showing the skeleton framework of the section shown in Figs. 2 and 3; Fig. 5 is a fragmentary sectional view indicated by the line 5—5 in Fig. 1; Fig. 6 is a section taken on the plane indicated by the line 6—6 in Fig. 5, but on a larger scale than that shown in Fig. 5; Fig. 7 is a sectional view showing a modification of the pin structure illustrated in Fig. 6; Fig. 8 is a plan view partly in section of a modified form of tread section adapted for use with a double supporting wheel structure; Figs. 9 and 10 are sections taken on the correspondingly numbered lines in Fig. 8; Fig. 11 is a view showing the ground engaging surface of a modified form of section construction wherein the ground engaging portion is metal but the wheel engaging portion is non-metallic material; Figs. 12 and 13 are sections taken on the correspondingly numbered lines in Fig. 11, and Fig. 14 is a sectional view showing a modification of the section wherein both the ground engaging surfaces and the wheel engaging surfaces are made of metal.

In Fig. 1 I have shown a portion of a track laying vehicle having an endless track indicated in general at 10, a driving sprocket wheel 11, and a supporting wheel 12, a plurality of which are usually disposed in tandem relationship between the upper and lower reaches of the track in the customary way. The present invention is particularly concerned with the construction of the track sections and particularly those of the single pin type.

According to the present invention, each track section has a skeleton framework as shown in Fig. 4, which comprises end members 15 and 16, a central member or bar 17 that extends parallel to the end members and is connected thereto, as by a tube 18, adjacent the midportion of the bar 17, and by spaced aligned tubes 19 and 20 which extend inwardly from the respective end members and are attached to arms 21 and 22 respectively at one end of the bar 17. The arms 21 and 22 thus form a bifurcation at one end of the central bar for interlinking engagement with the end 23 of the central bar on an adjacent section. The interlinking connection may be made by a pivot pin 25, shown in Fig. 5, which extends through the tubes 19 and 20 and also through a aperture in the end of a coacting bar, such as that shown at 26 in Fig. 4. The ends of each pin may be anchored in the respective end bars by bolts 28 and 29 respectively.

As shown in Fig. 5, the tubes 19 and 20 form outer sleeves for resilient bushings 30 and 31 respectively, which are interposed between outer sleeves 19 and 20 and inner sleeves 32 and 33 respectively.

In one form of construction, illustrated in Figs. 1 to 6, a block of rubber is molded around the tubular and central bar portions of the frame and is shaped on one side with a non-skid ground engaging surface 35 as shown in Fig. 2, and with a smooth supporting wheel engaging surface 36 as shown in Fig. 3. Suitable wheel guide arms 37 extend upwardly from the surface 36. Where the wheel side guides are disposed on the opposite ends of the tread blocks, the track is designed for use with a single row of supporting wheels 12. Where a double row is used, however, such as indicated at 12A and 12B in Fig. 9, then the wheel guides are disposed adjacent the central portion of the section as is indicated at 38 and 39 respectively.

To facilitate returning of the sections readily back to the position parallel to the ground after they have passed around the driving wheels, the resilient material in the bushings 30 and 31 is under tension between the respective inner and outer sleeves, and additionally, the inner sleeves are substantially rigid with the pins 25 by virtue of a tight fit therewith, whereas the outer sleeves are substantially rigid with the end and center bar members by virtue of a tight fit therein. In the construction of Figs. 1 to 5, the tight fitting engagement with the pin is obtained by means of a pressed fit between the pin and the inner sleeve, whereas in the construction of Fig. 6, the tight fitting engagement is obtained by means of a key connection 40 between the pin and the inner sleeve. In Fig. 7 the same result is obtained by utilizing a pin such as 29A which is non-circular in cross sectional shape and which engages an inner sleeve of complementary formation.

In the construction of Figs. 1 to 5, inclusive, the teeth of the driving sprocket wheel are adapted to enter openings 41 and 42 in the respective end pieces. In Fig. 8, however, there is illustrated a modification wherein a dual supporting wheel structure is utilized, in which case there may be an additional line of openings 43 for receiving sprocket teeth along the center line of the track. In this figure, the parts which correspond to those indicated at the previous figures are identified by corresponding numbers.

In the modification of Fig. 11, the ground engaging surface comprises a metallic plate 45 which spans the space between the frame tubes 18A, 19A and 20A and is welded thereto, while a non-skid portion 46, also made of metal, may be welded to the plate. In this construction, the rubber block is molded around the tubes and against the inner surface of the plate 45 and presents a smooth surface for engagement by the supporting wheels.

In the modification of Fig. 14, the tubular parts of the frame are spanned by a metallic ground engaging plate 50 and metallic supporting wheel engaging plates 51, while a structural member 52 extends between the plates to reinforce the center portions of the section. In this instance, as in the previous modification, the metallic plates are welded to the frame tubes and the connection between the adjacent links is obtained in the same manner as has been previously illustrated and described.

An advantage of the present invention is the fact that the track sections may be readily fabricated without the necessity for utilizing a large casting, and that where rubber is desired, it may readily be molded around the component parts of the section frame and used either alone or with steel load bearing plates, as desired. The invention enables the use of rubber tension bushings which facilitate the return of the sections to normal position parallel to the ground after they have passed around the sprocket wheel at each end of the vehicle.

I claim:

1. A fabricated section for a single pin track laying vehicle comprising parallel end members and a central member, tubular means interconnecting the respective members and making a rigid frame, the end members having openings therein for engagement with the teeth of a driving sprocket wheel, the central member having one end thereof apertured and having an apertured bifurcation at the other end adapted for receiving the end of a similarly formed central member on an adjacent section, and a pivot pin anchored to the end members and extending through the apertured bifurcation for interlinking the section to an adjacent section.

2. A track section for an endless track, comprising end members having openings therein for engagement with the teeth of a driving sprocket wheel and having other openings in alignment with each other, tubular members extending through the aligned openings and rigidly attached at their ends thereof to said members, and a block of flexible resilient material molded around the tubular members and extending between the end members.

3. A section for an endless track embodying a skeleton framework comprising end members, a center member having a guide thereon, and connecting tubular members, the respective end and center members having aligned apertures therein, tubes extending through the apertures and operating to connect the members together to form a rigid frame, the end members having openings therein for engagement with the teeth of a driving sprocket wheel, and a block of cushioning material molded around the connecting members and extending between the end members.

4. A track section for an endless track, comprising end members, a central member and tubular connecting members, the connecting members being rigidly fastened to the respective end and central members, and load bearing plates spanning the tubular members and rigidly fastened thereto and extending between the end members, the plates having grousers thereon for traction purposes.

5. A section for an endless track embodying a skeleton framework comprising end members, a central member, and connecting tubular members, the respective end and center members having aligned apertures therein, tubes extending through the apertures and operating to connect the members together to form a rigid frame, a block of cushioning material molded over and between the connecting members and extending between the end members, and a metallic load bearing plate rigidly secured to the tubular members and enclosing one side of the block, the load bearing plate having a grouser thereon for traction purposes.

6. A fabricated single pin track section for an endless track, comprising end members and a central member, tubular means connecting the respective end and center members, the end members having openings therein for engaging with the teeth of a driving sprocket wheel, and a rubber tread block molded around the tubular members and extending between the end members.

FRED L. HAUSHALTER.

REFERENCES CITED

The following references are of record in the file of this patent:

UNITED STATES PATENTS

| Number | Name | Date |
|---|---|---|
| 2,129,696 | Knox | Sept. 13, 1938 |
| 2,342,675 | Knox | Feb. 29, 1944 |
| 2,301,954 | Knox | Nov. 17, 1942 |
| 2,078,167 | Shields | Apr. 20, 1937 |
| 2,350,445 | Burgess | June 6, 1944 |